(12) United States Patent
Talawar et al.

(10) Patent No.: US 12,000,340 B1
(45) Date of Patent: Jun. 4, 2024

(54) GAS TURBINE ENGINE LUBRICANT FLOW CONTROL SYSTEM

(71) Applicant: HONEYWELL INTERNATIONAL INC., Charlotte, NC (US)

(72) Inventors: Ravi Talawar, Bangalore (IN); Jyotichandra Shivaji Roa Jingade, Bangalore (IN); Manjunatha Adiga, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/301,784

(22) Filed: Apr. 17, 2023

(30) Foreign Application Priority Data

Mar. 3, 2023 (IN) .............................. 202311014405

(51) Int. Cl.
*F02C 7/06* (2006.01)
*F16H 57/04* (2010.01)

(52) U.S. Cl.
CPC ........... *F02C 7/06* (2013.01); *F16H 57/0434* (2013.01)

(58) Field of Classification Search
CPC ...................................................... F02C 7/06
USPC ........................................ 60/39.08; 184/6.11
See application file for complete search history.

(56) References Cited

U.S. PATENT DOCUMENTS

| | | | |
|---|---|---|---|
| 6,058,694 A * | 5/2000 | Ackerman | F16N 29/02 60/39.08 |
| 8,196,484 B2 | 6/2012 | Holker et al. | |
| 8,794,095 B2 | 8/2014 | Merlet et al. | |
| 9,520,756 B2 * | 12/2016 | Fedosovsky | H02K 33/16 |
| 11,376,807 B2 | 7/2022 | Obrecht et al. | |
| 11,732,646 B2 * | 8/2023 | Gauthier | F01D 25/18 184/6.11 |
| 2018/0096582 A1 * | 4/2018 | Nanda | F01D 21/003 |
| 2019/0309835 A1 * | 10/2019 | Laurent | F16H 57/0497 |
| 2020/0063658 A1 * | 2/2020 | Kubo | F02C 7/143 |
| 2023/0012413 A1 * | 1/2023 | Gauthier | F01D 25/18 |

FOREIGN PATENT DOCUMENTS

RU 2719493 C1 4/2020
WO 2017041854 A1 3/2017

* cited by examiner

*Primary Examiner* — Michael R Mansen
*Assistant Examiner* — Mark K Buse
(74) *Attorney, Agent, or Firm* — Lorenz & Kopf LLP (57) ABSTRACT

A system for controlling lubricant flow to a component in a gas turbine engine includes a control valve, an electromechanical actuator, and an engine controller. The control valve includes a lubricant inlet that is in fluid communication with a pressurized lubricant source, a lubricant outlet is in fluid communication with the gas turbine engine component, and a valve element that is movable to a plurality of valve positions. The electromechanical valve actuator is coupled to the valve element and is responsive to actuator commands to position the valve element. The engine controller is coupled to receive a pressure sensor signal indicative of a compressor pressure in the gas turbine engine and, in response, determines a commanded valve element position and supplies the actuator commands to the electromechanical valve actuator that cause the electromechanical valve actuator to move the valve element to the commanded valve element position.

18 Claims, 5 Drawing Sheets

GAS TURBINE ENGINE LUBRICANT FLOW CONTROL SYSTEM

CROSS-REFERENCE TO RELATED APPLICATION

The present application claims benefit of prior filed India Provisional Patent Application No. 202311014405, filed Mar. 3, 2023, which is hereby incorporated by reference herein in its entirety.

TECHNICAL FIELD

This disclosure generally relates to gas turbine engines and, more particularly, relates to system for controlling lubricant flow to a component in a gas turbine engine.

BACKGROUND

Many gas turbine include an engine driven gearbox or various other accessories that are supplied with oil from an engine-driven oil pump. For example, many turbofan jet engines include a fan reduction gearbox coupled between the shaft of the gas turbine engine, which rotates at a high rate of speed, and the turbofan shaft, which operates more efficiently when rotating at a substantially lower speed. Such engine driven gearboxes are typically supplied with oil by an oil pump, such as a positive displacement pump, that is directly or indirectly driven by the engine shaft. Generally, the oil supply system is sized to ensure that the supply of the oil to the gears is sufficient to maintain proper operation at the maximum gear torque level. Thus, at gear torque levels below maximum, the supply of oil to the gearbox may exceed the amount necessary, causing the gearbox to churn the excess lubricant, and reducing oil service life.

To alleviate the above drawback, many gas turbine engines include a pneumatically actuated flow reduction valve, which regulates lubricant flow to the fan reduction gearbox (or other accessories requiring lubrication) as a function of engine load. More specifically, lubricant flow is regulated as a function of compressor discharge pressure, which correlates well gear torque output of the engine. This increases the overall efficiency of the system but also exhibits certain drawbacks. For example, the mechanical valve piston can become jammed due to excessive heating and friction. Moreover, when high-pressure, high-temperature air from the compressor enters the valve it increases the temperature of not only the valve body, but also the lubricant flowing through the valve. This can lead to decreased lubricant density and viscosity, which can increase lubricant flow into the gearbox and reduce the system efficiency.

Hence, there is a need for a lubricant supply system that does not exhibit the above-noted drawbacks. Namely, a lubricant supply system that includes a flow reduction valve that does not use high-pressure, high-temperature air from the compressor and thereby does not increase the temperature of the lubricant flowing through the valve. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a system for controlling lubricant flow to a component in a gas turbine engine includes a control valve, an electromechanical actuator, and an engine controller. The control valve includes a lubricant inlet, a lubricant outlet, and a valve element. The lubricant inlet is in fluid communication with a pressurized lubricant source, the lubricant outlet is in fluid communication with the gas turbine engine component, and the valve element movable to a plurality of valve positions. The electromechanical valve actuator is coupled to the valve element and is responsive to actuator commands to move the valve element to the plurality of valve element positions. The engine controller is coupled to receive a pressure sensor signal indicative of a compressor pressure sensed in the gas turbine engine. The engine controller is configured, in response to the pressure sensor signal, to (i) determine a commanded valve element position and (ii) supply the actuator commands to the electromechanical valve actuator that cause the electromechanical valve actuator to move the valve element to the commanded valve element position, to thereby control lubricant flow to the component in the gas turbine engine.

In another embodiment, a system for controlling lubricant flow to a component in a gas turbine engine includes a control valve, an electromechanical actuator, and an engine controller. The control valve includes a lubricant inlet, a lubricant outlet, and a valve element. The lubricant inlet is in fluid communication with a pressurized lubricant source, the lubricant outlet is in fluid communication with the gas turbine engine component, and the valve element movable to a plurality of valve positions. The electromechanical valve actuator is coupled to the valve element and is responsive to actuator commands to move the valve element to the plurality of valve element positions. The plurality of valve element positions include a first end position, a plurality of throttle positions, and a second end position. The engine controller is coupled to receive a pressure sensor signal indicative of a compressor pressure sensed in the gas turbine engine. The engine controller is configured, in response to the pressure sensor signal, to (i) determine a commanded valve element position and (ii) supply the actuator commands to the electromechanical valve actuator that cause the electromechanical valve actuator to move the valve element to the commanded valve element position, to thereby control lubricant flow to the component in the gas turbine engine. The control valve further includes a flow chamber disposed between the lubricant inlet and the lubricant outlet, and the flow chamber has a plurality of first flow orifices and a plurality of second flow orifices. The first flow orifices are disposed downstream of the lubricant inlet and are configured such that lubricant may continuously flow through the first flow orifices regardless of the valve element position. The second flow orifices are disposed downstream of the first flow orifices and are configured such that lubricant flow through the second flow orifices is controlled based on the valve element position.

In yet another embodiment, a gas turbine engine system includes a gas turbine engine and a lubrication control system. The gas turbine engine includes at least a an intake section, a compressor section, a combustion section, a turbine section, an exhaust section, and a fan reduction gearbox. The lubrication control system controls lubricant flow to the fan reduction gearbox and includes a control valve, an electromechanical actuator, and an engine controller. The control valve includes a lubricant inlet, a lubricant outlet, and a valve element. The lubricant inlet is in fluid communication with a pressurized lubricant source, the lubricant outlet is in fluid communication with the gas turbine engine component, and the valve element movable to a plurality of valve positions. The electromechanical valve actuator is coupled to the valve element and is responsive to actuator commands to move the valve element to the plurality of valve element positions. The engine controller is coupled to receive a pressure sensor signal indicative of a compressor pressure sensed in the gas turbine engine. The engine controller is configured, in response to the pressure sensor signal, to (i) determine a commanded valve element position and (ii) supply the actuator commands to the electromechanical valve actuator that cause the electromechanical valve actuator to move the valve element to the commanded valve element position, to thereby control lubricant flow to the fan reduction gearbox.

Furthermore, other desirable features and characteristics of the lubricant supply system and gas turbine engine system will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
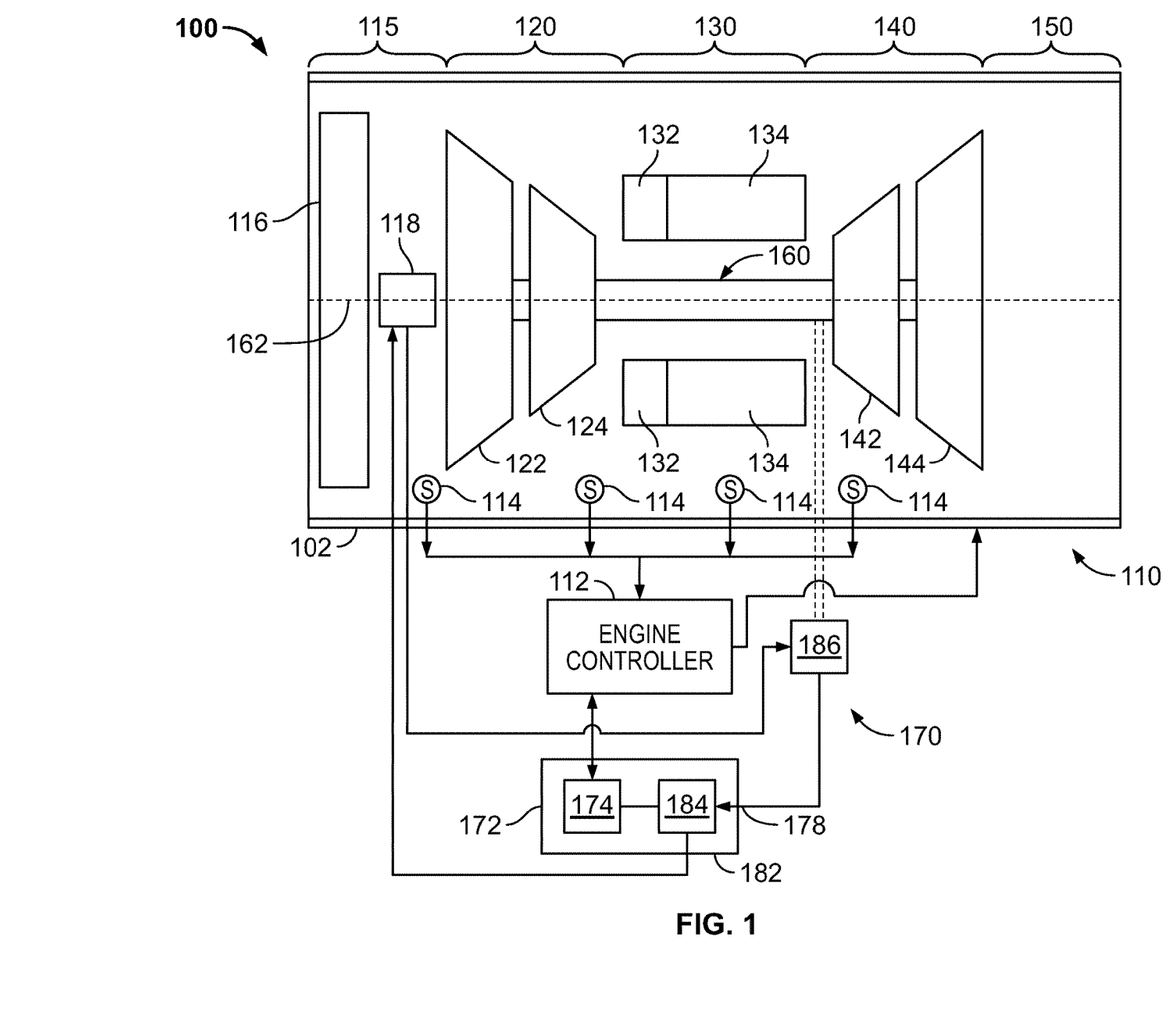
FIG. 1 depicts a simplified cross-sectional view of one embodiment of a gas turbine engine system.

Referring to FIG. 1, a simplified cross-sectional view of one embodiment of a gas turbine engine system 100 is depicted. The gas turbine engine system 100 includes a gas turbine engine 110 and an engine controller 112. The gas turbine engine 110, which is disposed in an engine housing 102, includes an intake section 115, a compressor section 120, a combustion section 130, a turbine section 140, and an exhaust section 150. The compressor section 120 and turbine section 140 are operably coupled to a shaft assembly 160 for rotation within the housing 102. A fluid (e.g., air) is drawn into the engine housing 110 through the intake section 115 and into the compressor section 120. The compressor section 120, which in the depicted embodiment is configured as an axial-centrifugal compressor, includes an axial compressor 122 and a centrifugal compressor 124. Together, these compressors 122, 124 compress, and thus increase the pressure of, the fluid entering the engine 100 and supply the compressed fluid into the combustion section 130. It will be appreciated that in other embodiments, the compressor section 120 may be implemented using any one of numerous other types of compressors.

The combustion section 130 includes a combustor air inlet 132 and a combustion chamber 134. The combustor air inlet 132 is in fluid communication with the axial-centrifugal compressor 120, and it directs the compressed fluid into the combustion chamber 134. In the combustion chamber 134, the compressed fluid is mixed with fuel and is combusted in the combustion chamber 134. Hot exhaust fluids are then directed into the turbine section 140.

The hot exhaust fluids expand through, and rotate, the turbine section 140 prior to being exhausted through the exhaust section 150. The turbine section 140 rotates to drive equipment in the gas turbine engine 110 via rotors or spools concentrically disposed about an axis of rotation 162 within the shaft assembly 160. Specifically, the turbine section 140 may include one or more rotors 142, 144 driven by the expanding hot exhaust fluids to rotate the shaft assembly 160 and drive the axial and centrifugal compressors 122, 124 and, at least in the depicted embodiment, an inlet fan 116 via a plurality of gears housed within a fan reduction gearbox 118.

The overall operation of the gas turbine engine 110 is controlled via the engine controller 112. The engine controller 112, as is generally known, is used to control the output power of the gas turbine engine 110 by, for example, controlling fuel flow rate to the gas turbine engine 110, as well as controlling airflow through the gas turbine engine 110. In the depicted embodiment, the engine controller 110 receives signals from a plurality of sensors 114 that are disposed at various locations on and within the gas turbine engine 110. The sensors 114 are used to sense various physical parameters associated with the gas turbine engine 110 such as, for example, various temperatures, various pressures, engine speed, and air flow, and supply signals representative of the sensed parameters to the engine controller 112. The engine controller 112 processes the signals received from the sensors 114 and, among other things, supplies various commands to the gas turbine engine 110 to control its operation. It will be appreciated that the engine controller 112 may be any one of numerous types of engine controllers such as, for example, a FADEC (Full Authority Digital Engine Controller). As will be described momentarily, the engine controller 112 is also used to control the flow of lubricant to one or more components within the gas turbine engine 110.

Before proceeding further, it is noted that although FIG. 1 depicts an exemplary configuration of a turbofan gas turbine engine, other embodiments may have alternate configurations. Thus, the exemplary embodiments discussed herein are not intended to be limited to a turbofan gas turbine engine, but rather may be readily adapted for use in other types of gas turbine engines including but not limited to turboshaft and turboprop gas turbine engines.

Returning to the description, it is seen that the gas turbine engine system 100 additionally includes a lubricant flow control system 170 for controlling lubricant flow to one or more components in the gas turbine engine 110. As FIG. 1 illustrates, in the depicted embodiment the one or more components is the fan reduction gearbox 118. It will be appreciated, however, that in other embodiments the one or more components may be any one of numerous components in the gas turbine engine 110 for which lubricant flow may need to be controlled.

Regardless of the specific component, the lubricant flow control system 170 includes a control valve 172, an electromechanical valve actuator 174, and the engine controller 112. The control valve 172 includes a lubricant inlet 178, a lubricant outlet 182, and a valve element 184. The lubricant inlet 178 is in fluid communication with a pressurized lubricant source 186, the lubricant outlet 182 is in fluid communication with the gas turbine engine component (e.g., fan reduction gearbox 118), and the valve element 184 is movable to a plurality of valve positions. It should be noted that although the pressurized lubricant source 186 may be variously configured and implemented, in the depicted embodiment it is implemented using, among other components, a positive displacement pump, which is also driven by the shaft assembly 160, and a constant pressure regulator so that the pump provides a constant lubricant flow over the entire operating range of the gas turbine engine 110.

The electromechanical valve actuator 174 is coupled to the valve element 184 and is responsive to actuator commands to move the valve element 184 to the plurality of valve element positions. It will be appreciated that the valve actuator 174 may be implemented using any one of numerous known electromechanical devices. Some non-limiting examples of suitable electromechanical devices include a stepper motor, a linear actuator (e.g., LVDT), various types of DC motors, and various types of AC motors, just to name a few. Regardless of how the electromechanical valve actuator 174 is specifically implemented, it is preferably configured, upon a loss of electrical power thereto, to move the valve element 184 to a specific position, which is described further below.

The engine controller 112 is coupled to receive a pressure sensor signal indicative of a compressor pressure sensed in the gas turbine engine 110. The engine controller 112 is configured, in response to the pressure sensor signal, to determine a commanded valve element position and to supply actuator commands to the electromechanical valve actuator 174 that will cause the electromechanical valve actuator 174 to move the valve element 184 to the commanded valve element position, to thereby control lubricant flow to the component (e.g., fan reduction gearbox 118) in the gas turbine engine 110.

It will be appreciated that the pressure sensor signal is supplied from one of the above-mentioned sensors 114, and it may be implemented using any one of numerous types of suitable pressure sensors. The specific compressor pressure that the pressure sensor 114 senses may also vary. For example, the compressor pressure may be fan stage discharge pressure (P2) or high-pressure compressor stage discharge pressure (P3). In one particular embodiment, the compressor pressure is the fan stage discharge pressure (P2), since many existing engines already include this sensor, and manual tapping to sense high-pressure compressor stage discharge pressure (P3) can be avoided. In other embodiments, a sensor can be provided to sense high-pressure compressor stage discharge pressure (P3).

Figure 2:
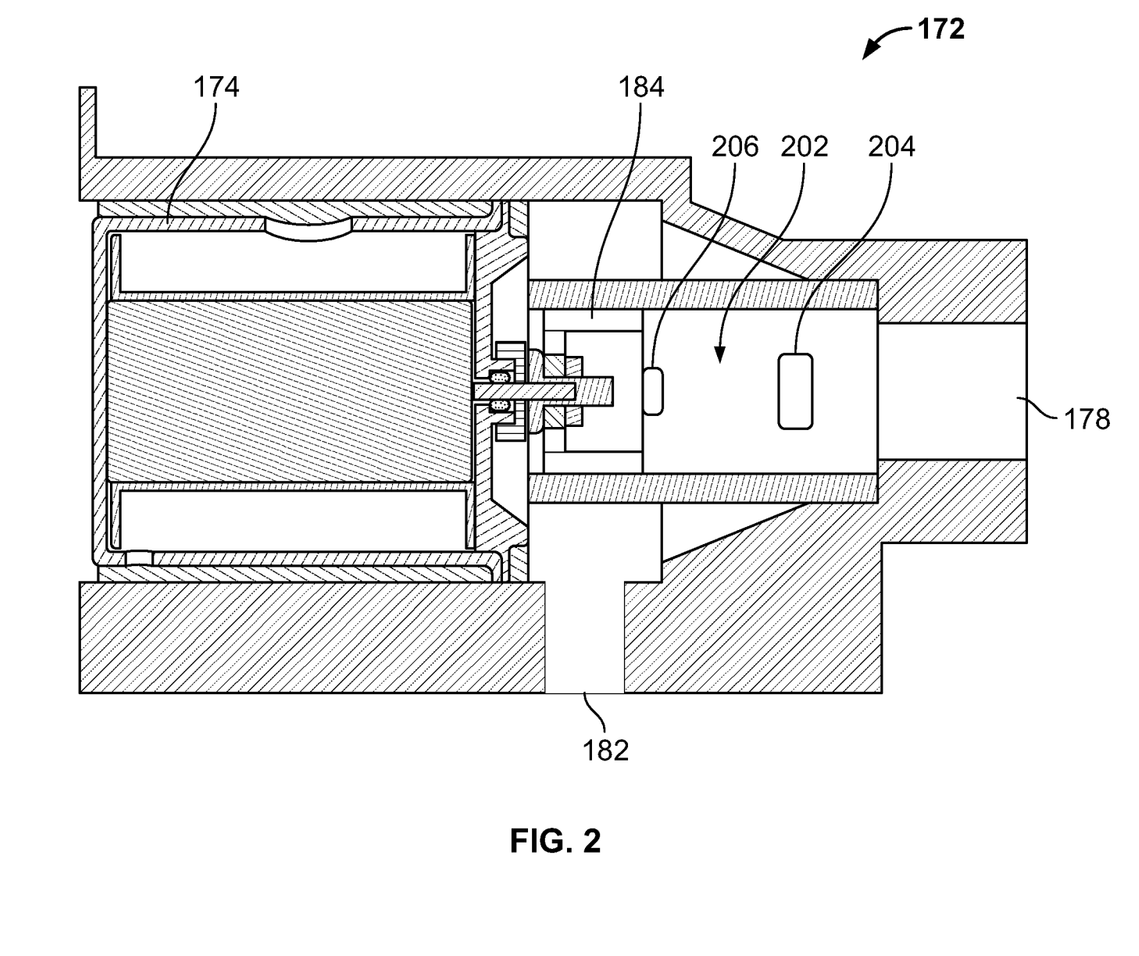
FIGS. 2-4 depict an example of one embodiment of a control valve that may be implemented in the system of FIG. 1 and in various valve element positions.
Figure 3:
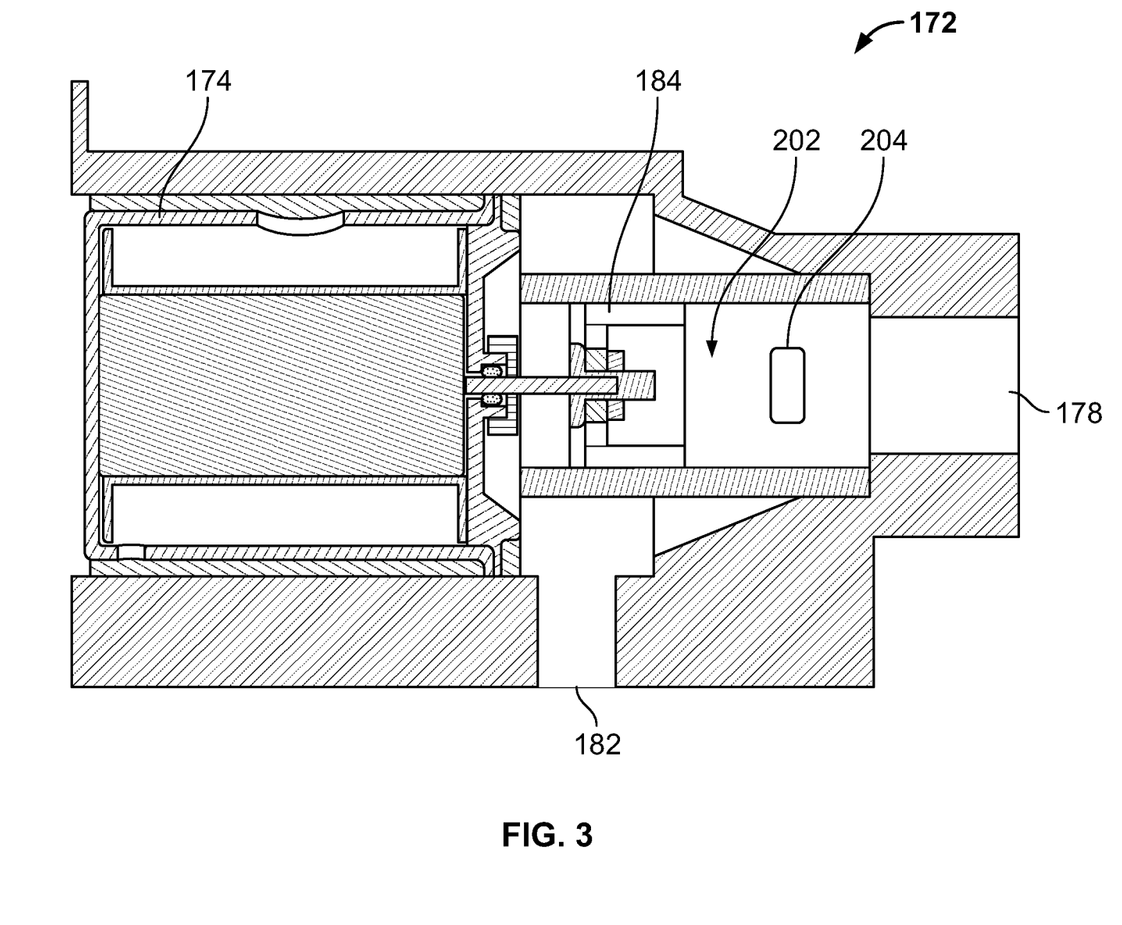
Figure 4:
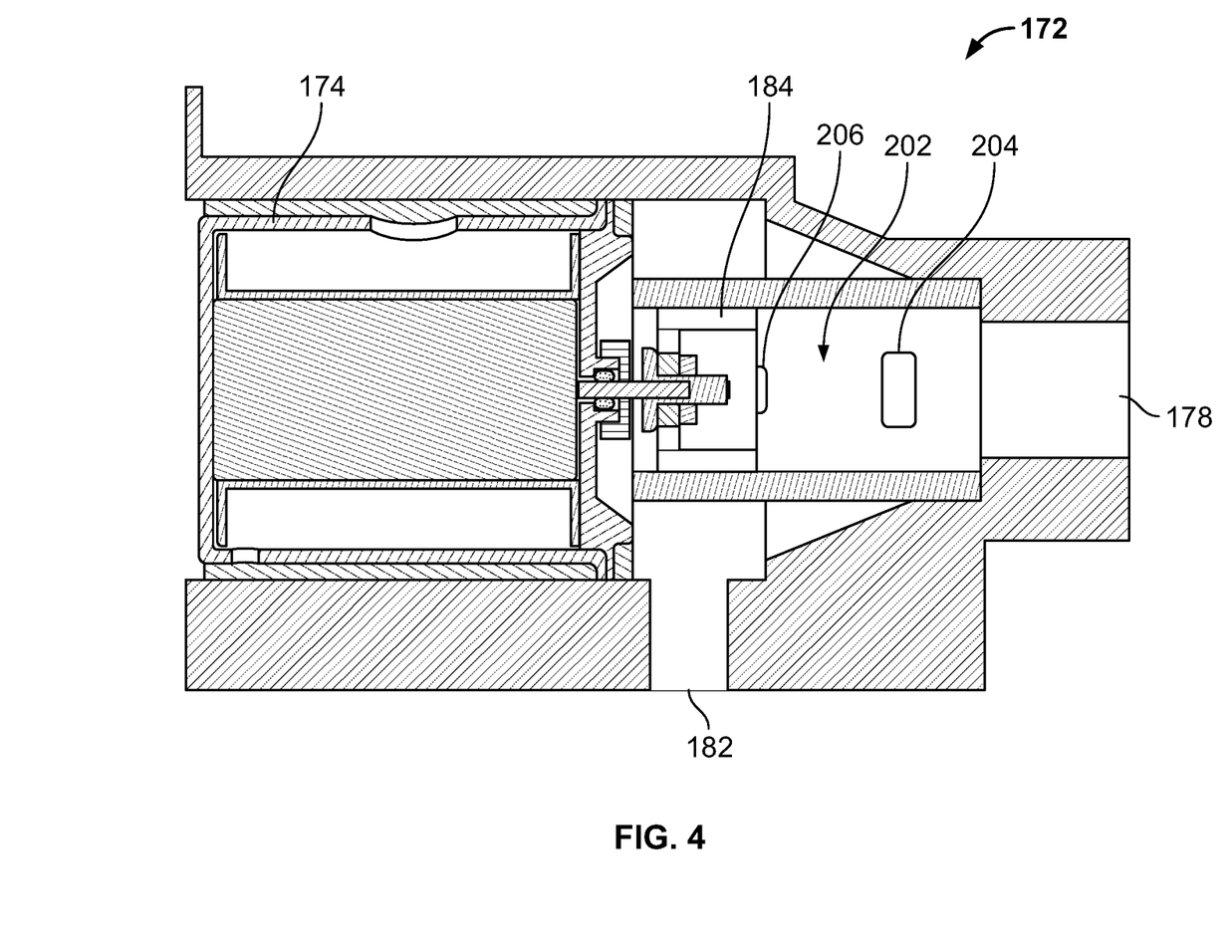

Turning now to FIGS. 2-4, an example of one embodiment of the control valve 172 is depicted and will be described. The depicted control valve 172, in addition to the lubricant inlet 178, a lubricant outlet 182, and a valve element 184, further includes a flow chamber 202 disposed between the lubricant inlet 182 and the lubricant outlet 184. The flow chamber 202 has a plurality of first flow orifices 204 and a plurality of second flow orifices 206. The first flow orifices 204 are disposed downstream of the lubricant inlet 178 and are configured such that lubricant may continuously flow through the first flow orifices 204 regardless of the valve element position. The second flow orifices 206 are disposed downstream of the first flow orifices 204 and are configured such that lubricant flow through the second flow orifices 206 is controlled based on the valve element position. Although only one first flow orifice 204 and only one second flow orifice 206 are visible in FIG. 2, it will be appreciated that the flow chamber 202 preferably includes at least two first flow orifices 204 and at least two second flow orifices 206.

More specifically, it is noted that the valve element positions include a first end position, a plurality of throttle positions, and a second end position. In the first end position, which is the position depicted in FIG. 3, the valve element 184 prevents lubricant flow through the second flow orifices 206. In the throttle positions, one of which is depicted in FIG. 4, the valve element 184 throttles lubricant flow through the second flow orifices 206. In the second end position, which is the position depicted in FIG. 2, the valve element 184 allows non-throttled lubricant to flow though the second flow orifices 206.

The first flow orifices 204 are configured such that, when the valve element 184 is in the first end position, lubricant flow from the lubricant inlet 178 to the lubricant outlet 182 is 60% of what lubricant flow is when the valve element 184 is in the second end position (e.g., 100%). As was noted above, the electromechanical valve actuator 174 is configured, upon a loss of electrical power thereto, to move the valve element 184 to a specific position. Preferably, the specific position is the second end position, such that, upon a loss of electrical power, 100% lubricant flow through the control valve 172 is allowed. It is noted that the first and second flow orifices 204, 206 are, at least in the depicted embodiment, are substantially rectangular in shape. However, other shapes could also be used.

Figure 5:
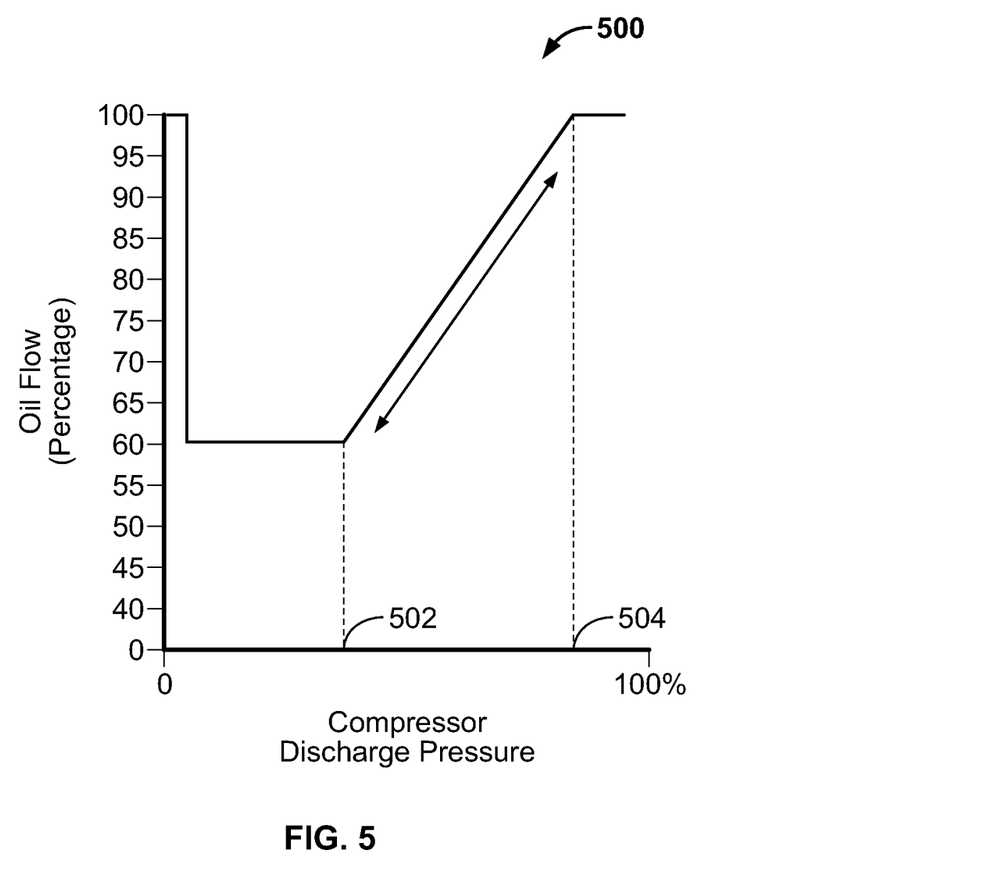
FIG. 5 depicts a is a plot of lubricant flow through the control valve of FIGS. 2-4 versus compressor discharge pressure.

The manner in which the system 170 controls lubricant flow to the component (e.g., fan reduction gearbox 118) is depicted in FIG. 5, which is a plot 500 of lubricant flow through the control valve 172 versus compressor discharge pressure. As illustrated therein, at startup of the gas turbine engine 110, the valve element 184 is in the second position, thus lubricant flow through the control valve 172 is initially 100%. However, thereafter the valve element 184 is rapidly moved to the first position, and thus lubricant flow through the control valve 172 drops very rapidly to 60%. This rapid drop, which occurs with little-to-no slope in the plot 500, may occur due to the above-described configuration of the control valve 172.

After startup, when the gas turbine engine 110 is idling or operating at a relatively high altitude, compressor discharge pressure is in the minimum operational pressure range. As a result, the valve element remains in the first position and lubricant flow through the control valve 172 remains at 60%. This amount of lubricant flow is sufficient for satisfactory operation of the component (e.g., fan reduction gearbox 118) and other components that may require lubrication at the minimum operational load of the gas turbine engine 110. This amount of lubricant flow also conserves energy that would otherwise be wasted due to churning of the excess oil in the fan reduction gearbox 118.

As FIG. 5 depicts, the valve element 184 is commanded to remain in the first position, and thus lubricant flow through the control valve 172 remains at 60%, until a predetermined compressor discharge pressure 502 is reached. At that point, the valve element 184 is commanded to move to the throttle positions and lubricant flow through the control valve 172 varies as a function of compressor discharge pressure. As FIG. 5 also depicts, lubricant flow through the valve element 184 will increase if compressor discharge pressure increases, until the valve element 184 is in the second position, at which point 504 lubricant flow through the control valve 172 is 100%. The variation in lubricant flow for compressor discharge pressures above the predetermined compressor discharge pressure 502 accommodates the optimal lubrication requirements of the fan reduction gearbox 118 and other components as engine load varies.

The lubricant supply system described herein includes a control valve that does not use high-pressure, high-temperature air from the compressor and thereby does not increase the temperature of the lubricant flowing through the valve.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for controlling lubricant flow to a component in a gas turbine engine, the system comprising:
    a control valve including a lubricant inlet, a lubricant outlet, and a valve element, the lubricant inlet in fluid communication with a pressurized lubricant source, the lubricant outlet in fluid communication with the gas turbine engine component, the valve element movable to a plurality of valve element positions;
    an electromechanical valve actuator coupled to the valve element and responsive to actuator commands to move the valve element to the plurality of valve element positions; and
    an engine controller coupled to receive a pressure sensor signal from a pressure sensor, the pressure sensor signal indicative of a compressor pressure sensed in the gas turbine engine, the engine controller configured, in response to the pressure sensor signal, to (i) determine a commanded valve element position and (ii) supply the actuator commands to the electromechanical valve actuator that cause the electromechanical valve actuator to move the valve element to the commanded valve element position, to thereby control lubricant flow to the component in the gas turbine engine,
    wherein:
        the control valve further includes a flow chamber disposed between the lubricant inlet and the lubricant outlet, the flow chamber having a plurality of first flow orifices and a plurality of second flow orifices;
        the first flow orifices are disposed downstream of the lubricant inlet and configured such that lubricant may continuously flow through the first flow orifices regardless of the valve element position; and
        the second flow orifices are disposed downstream of the first flow orifices and configured such that lubricant flow through the second flow orifices is controlled based on the valve element position.

2. The system of claim 1, wherein the plurality of valve element positions include:
    a first end position, in which the valve element prevents lubricant flow through the second flow orifices;
    a plurality of throttle positions, in which the valve element throttles lubricant flow through the second flow orifices; and
    a second end position, in which the valve element allows non-throttled lubricant to flow through the second flow orifices.

3. The system of claim 2, wherein:
    the first flow orifices are configured such that, when the valve element is in the first end position, lubricant flow from the lubricant inlet to the lubricant outlet is 60% of what lubricant flow is when the valve element is in the second end position.

4. The system of claim 2, wherein the electromechanical valve actuator is configured, upon a loss of electrical power thereto, to move the valve element to the second end position.

5. The system of claim 1, wherein the compressor pressure is one of a fan stage discharge pressure (P2) or a high-pressure compressor stage discharge pressure (P3).

6. The system of claim 1, wherein the component is a fan reduction gearbox.

7. The system of claim 1, wherein the electromechanical actuator comprises a linear actuator.

8. A system for controlling lubricant flow to a component in a gas turbine engine, the system comprising:
    a control valve including a lubricant inlet, a lubricant outlet, and a valve element, the lubricant inlet in fluid communication with a pressurized lubricant source, the lubricant outlet in fluid communication with the gas turbine engine component, the valve element movable to a plurality of valve element positions, the plurality of valve elements including a first end position, a plurality of throttle positions, and a second end position;
    an electromechanical valve actuator coupled to the valve element and responsive to actuator commands to move the valve element to the plurality of valve element positions; and
    an engine controller coupled to receive a pressure sensor signal from a pressure sensor, the pressure sensor signal indicative of a compressor pressure sensed in the gas turbine engine, the engine controller configured, in response to the pressure sensor signal, to (i) determine a commanded valve element position and (ii) supply the actuator commands to the electromechanical valve actuator that cause the electromechanical valve actuator to move the valve element to the commanded valve element position, to thereby control lubricant flow to the component in the gas turbine engine, wherein:

the control valve further includes a flow chamber disposed between the lubricant inlet and the lubricant outlet, the flow chamber having a plurality of first flow orifices and a plurality of second flow orifices;

the first flow orifices are disposed downstream of the lubricant inlet and configured such that lubricant may continuously flow through the first flow orifices regardless of the valve element position; and the second flow orifices are disposed downstream of the first flow orifices and configured such that lubricant flow through the second flow orifices is controlled based on the valve element position.

9. The system of claim 8, wherein:

in the first end position the valve element prevents lubricant flow through the second flow orifices;

in the plurality of throttle positions the valve element throttles lubricant flow through the second flow orifices; and in the second end position the valve element allows non-throttled lubricant to flow through the second flow orifices.

10. The system of claim 9, wherein:

the first flow orifices are configured such that, when the valve element is in the first end position, lubricant flow from the lubricant inlet to the lubricant outlet is 60% of what lubricant flow is when the valve element is in the second end position.

11. The system of claim 9, wherein the electromechanical valve actuator is configured, upon a loss of electrical power thereto, to move the valve element to the second end position.

12. The system of claim 8, wherein the compressor pressure is one of a fan stage discharge pressure (P2) or a high-pressure compressor stage discharge pressure (P3).

13. The system of claim 8, wherein the component is a fan reduction gearbox.

14. The system of claim 8, wherein the electromechanical actuator comprises a linear actuator.

15. A gas turbine engine system, comprising:

a gas turbine engine, the gas turbine engine including at least an intake section, a compressor section, a combustion section, a turbine section, an exhaust section, and a fan reduction gearbox; and a lubrication control system for controlling lubricant flow to the fan reduction gearbox, the lubrication control system comprising:

a control valve including a lubricant inlet, a lubricant outlet, and a valve element, the lubricant inlet in fluid communication with a pressurized lubricant source, the lubricant outlet in fluid communication with the gas turbine engine component, the valve element movable to a plurality of valve element positions;

an electromechanical valve actuator coupled to the valve element and responsive to actuator commands to move the valve element to the plurality of valve element positions; and an engine controller coupled to receive a pressure sensor signal from a pressure sensor, the pressure sensor signal indicative of a compressor pressure sensed in the gas turbine engine, the engine controller configured, in response to the pressure sensor signal, to (i) determine a commanded valve element position and (ii) supply the actuator commands to the electromechanical valve actuator that cause the electromechanical valve actuator to move the valve element to the commanded valve element position, to thereby control lubricant flow to the fan reduction gearbox, wherein:

the control valve further includes a flow chamber disposed between the lubricant inlet and the lubricant outlet, the flow chamber having a plurality of first flow orifices and a plurality of second flow orifices;

the first flow orifices are disposed downstream of the lubricant inlet and configured such that lubricant may continuously flow through the first flow orifices regardless of the valve element position; and the second flow orifices are disposed downstream of the first flow orifices and configured such that lubricant flow through the second flow orifices is controlled based on the valve element position.

16. The system of claim 15, wherein the plurality of valve element positions include:

a first end position, in which the valve element prevents lubricant flow through the second flow orifices;

a plurality of throttle positions, in which the valve element throttles lubricant flow through the second flow orifices; and a second end position, in which the valve element allows non-throttled lubricant to flow through the second flow orifices.

17. The system of claim 16, wherein:

the first flow orifices are configured such that, when the valve element is in the first end position, lubricant flow from the lubricant inlet to the lubricant outlet is 60% of what lubricant flow is when the valve element is in the second end position.

18. The system of claim 15, wherein the compressor pressure is one of a fan stage discharge pressure (P2) or a high-pressure compressor stage discharge pressure (P3).

* * * * *